US008204929B2

(12) United States Patent
Roginsky et al.

(10) Patent No.: US 8,204,929 B2
(45) Date of Patent: Jun. 19, 2012

(54) HIDING SENSITIVE INFORMATION

(75) Inventors: Allen Leonid Roginsky, Durham, NC (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 2720 days.

(21) Appl. No.: 09/999,643

(22) Filed: Oct. 25, 2001

(65) Prior Publication Data

US 2003/0084339 A1 May 1, 2003

(51) Int. Cl.
*G06F 15/16* (2006.01)
(52) U.S. Cl. ........ 709/201; 709/231; 709/202; 709/203; 709/227; 709/236; 380/201; 380/203; 380/205; 380/206; 380/209; 713/165; 713/167
(58) Field of Classification Search .................... 705/72, 705/18; 380/28, 42, 252, 201, 203, 205, 380/206, 209; 709/201, 202, 203, 231, 236, 709/227; 713/165, 167
See application file for complete search history.

(56) References Cited

U.S. PATENT DOCUMENTS

| | | | |
|---|---|---|---|
| 5,323,464 A | | 6/1994 | Elander et al. .................. 380/24 |
| 5,438,622 A * | | 8/1995 | Normile et al. ................. 380/46 |
| 5,491,749 A * | | 2/1996 | Rogaway ....................... 713/171 |
| 5,987,124 A * | | 11/1999 | Matyas et al. ................... 380/37 |
| 6,055,321 A | | 4/2000 | Numao et al. ................. 382/100 |
| 6,094,485 A | | 7/2000 | Weinstein et al. .............. 380/30 |
| 6,118,873 A * | | 9/2000 | Lotspiech et al. ............. 380/277 |
| 6,119,108 A * | | 9/2000 | Holmes et al. .................. 705/40 |
| 6,128,735 A * | | 10/2000 | Goldstein et al. ............. 713/166 |
| 6,263,086 B1 | | 7/2001 | Wang ............................ 382/100 |
| 6,356,595 B1 * | | 3/2002 | Czaja et al. .................... 375/262 |
| 6,601,170 B1 * | | 7/2003 | Wallace, Jr. ................... 713/168 |
| 6,851,052 B1 * | | 2/2005 | Graveman .................... 713/168 |

FOREIGN PATENT DOCUMENTS

EP   0991005 A2 *   9/1999

OTHER PUBLICATIONS

"Automatic Text Categorization", David D. Lewis, Apr. 22, 2001.*

* cited by examiner

*Primary Examiner* — Lan-Dai T Truong
(74) *Attorney, Agent, or Firm* — David A. Mims, Jr.; Mark Vallone; Robert V. Wilder

(57) ABSTRACT

An improved methodology and implementing computer system are provided in which sensitive information is selectively masked in order to enable such information to be relatively securely and efficiently transmitted over networks without disclosure of such sensitive information at a transmitting or receiving terminal, or at points along the data transmission network.

19 Claims, 4 Drawing Sheets

| | | |
|---|---|---|
| SS# (assumed) | 123498765 | |

| | | |
|---|---|---|
| *m* (calculated) | 01010101 ———————————————————— | 01 |
| *c* (assumed) | 00010001 ———————————————————— | 0001 |
| *agent_id* (assumed) | 10001000 ———————————————————— | 1000 |
| *n* (calculated) | 11011101 ———————————————————— | 1101 |

| | | |
|---|---|---|
| s*c (mod *N*) (remainder) | 111111111111 ——————————-11111 | 10000010010111101101101 |
| *x* (calculated) | 10101010 ———————————-1010 | 1101011100001011100001000 |
| *u* (calculated) | 10011001 ———————————————————— | 1001 |

HIDING SENSITIVE INFORMATION

FIELD OF THE INVENTION

The present invention relates generally to information processing systems and more particularly to a methodology and implementation for hiding information within information processing systems.

BACKGROUND OF THE INVENTION

With the increasing use of networks and multi-network systems, there is an increasing concern for the privacy of information which is transferred within and between such networks. Solving privacy concerns is critical to the future development and security of electronic-based business transactions and the building of trust in the use of such transactions. The transfer of information across the Internet and the development of a large number of business-to-consumer, business-to-business and business-to-government applications has resulted in the potential exposure of sensitive information such as a patient's medical history, social security numbers, credit card numbers, and so on. To simplify the present disclosure, social security numbers are hereinafter used to illustrate an information hiding technology although it is understood that the disclosed methodology applies equally well to any kind of sensitive information that may need to be protected.

The threat to individual privacy has been recognized by computer scientists and government agencies around the world. Various legislation has been passed and new legislation is being considered around the world to protect sensitive information. Many industries have specific legislation governing the collection and use of an individual's sensitive information while some regulations deal with multiple industries. There are financial industry regulations, medical industry regulations (Health Industry Portability and Accountability Act—HIPAA), child protection legislation (Children's Online Privacy Protection Act—COPPA), the European Union Data Protection Directive, and many other examples.

Multiple techniques have been developed for data encryption that will make any data passed over the Internet unrecognizable to even the most sophisticated intruder. Such encryption techniques and associated protocols to establish and manage keys used in encryption will protect sensitive information as it is transmitted across non-secure or un-trusted networks. However, such encryption techniques impose an additional performance overhead on already overloaded networks.

Experience shows that there is no common answer to all threats to data security and privacy. Some highly sensitive information can only be passed if it were encrypted with long encryption keys. Examples of such data include important state, military or commercial secrets or the content of high value financial transactions.

Moderately sensitive information exists which needs to be protected for privacy reasons but is not of such great value to justify the implementation resources needed to abort the efforts of a sophisticated attacker. For example, one instance of such data is the social security number used by insurance companies to identify a customer. It is highly undesirable to send such numbers, in the clear or unmasked, over the Internet or even over a company's private network. For purposes of the present disclosure, the term "network" is used in the broadest possible sense and includes private and public networks which may further include wireless and hard-wired segments. A so-called computer "hacker", even with only minimum skills, or even a casual observer would be able to obtain unmasked social security numbers and wrongfully use such numbers to impersonate another individual. Such an intruder may, for example, use a wrongfully obtained social security number of another person in applying for a credit card, or obtaining copies of documents issued in that other person's name (such as a birth certificate, marriage and/or divorce papers, or medical records), or solely to obtain false identification papers.

Quite often, it is not even an attacker who observes the sensitive data that are transmitted in clear text. For example, a clerk working an the offices of an insurance company may see arrays of customers' social security numbers on a computer screen. Even if no harm is caused by such exposure, it may constitute a violation of the customers privacy and is highly undesirable.

Thus, there is a need for an improved method and system for protecting sensitive data that are accessed and/or transmitted over networked systems.

SUMMARY OF THE INVENTION

An improved methodology and implementing computer system are provided in which sensitive information is selectively masked in order to enable such information to be relatively securely and efficiently transmitted over networks without disclosure of such sensitive information at an originating or receiving terminal, or at points along the data transmission network.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented within a typical computer system which may include a server and a user workstation or personal computer. Both the server and the user workstation include code to implement the methodology hereinafter disclosed. In general, an implementing computer system may include a plurality of processors in a multi-bus system in a network of similar systems. However, since the server and workstation or computer system implementing the present invention in an exemplary embodiment, is generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention.

Figure 1:
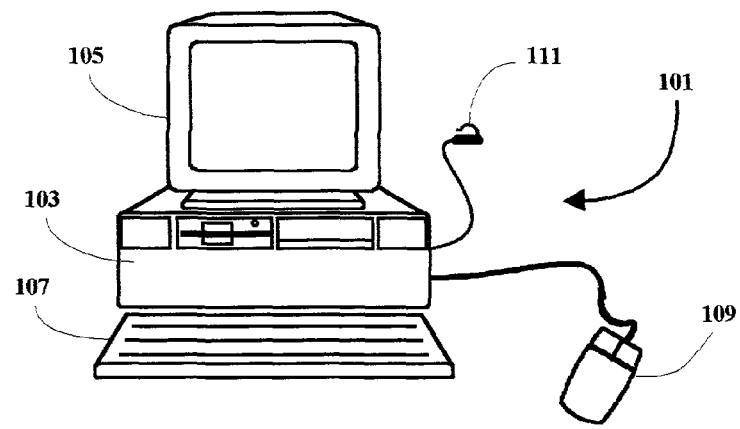
FIG. 1 is a diagram of a computer system in which the present invention may be implemented.

In the exemplary embodiment, an insurance company model is used in which an insurance agent or user terminal is connected to a company server through an interconnection network. As shown in FIG. 1, a user or agent terminal computer system includes an electronics enclosure 103 which is typically arranged for housing one or more CPUs (central processing units) along with other component devices and subsystems of the computer system 101. Although a "desktop" system is shown in the example, it is understood that the present invention may also be implemented in smaller portable personal computer system devices including mobile and cellular hand-held devices. The computer system 101 also includes a display device 105, a keyboard 107 and a mouse or pointing device 109, which are all interconnected within the illustrated computer system. The present invention may also be implemented in a laptop computer having a display device other than a CRT (cathode ray tube). Also shown in FIG. 1 is a connector 111 which is arranged for connecting a modem within the computer system to a communication line such as a telephone line in the present example. The present invention may also be implemented in a mobile or cellular system.

Figure 2:
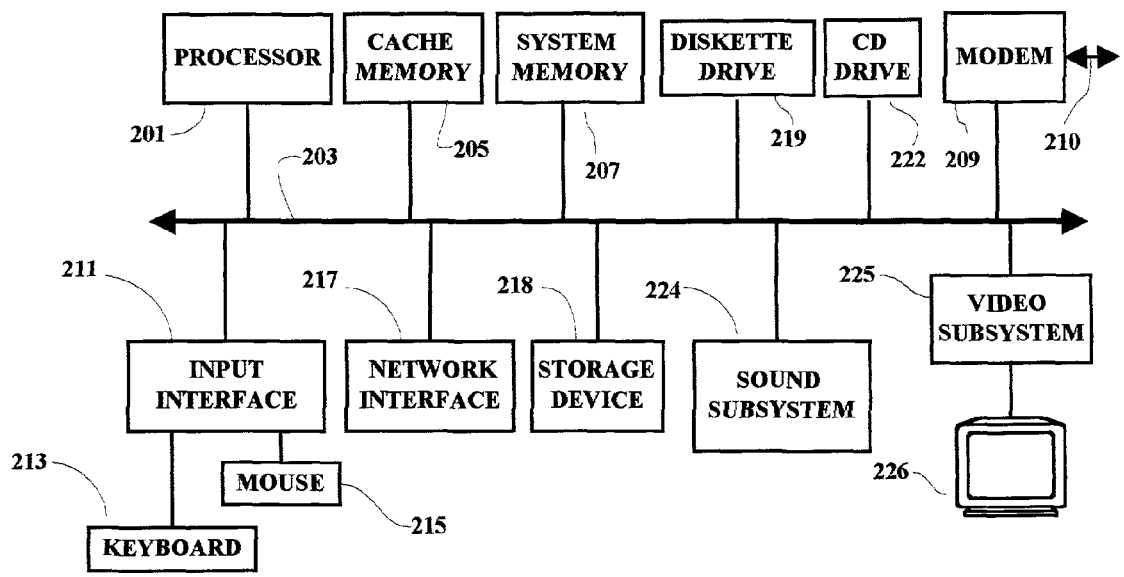
FIG. 2 is a simplified schematic diagram showing selected components and subsystems of the computer system illustrated in FIG. 1.

Several of the major components of the system 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit 207 are also connected to the bus 203. A modem 209 is arranged for connection 210 to a communication line, such as a telephone line, through a connector 111 (FIG. 1). The modem 209, in the present example, selectively enables the computer system 101 to establish a communication link and initiate communication with another computer system, or network or database server.

The system bus 203 is also connected through an input interface circuit 211 to a keyboard 213 and a mouse or pointing device 215. The bus 203 is also coupled to a separate network subsystem interface 217, a diskette drive unit 219 and a CD drive device 222. A video subsystem 225, which may include a graphics subsystem, is connected to a display device 226. As hereinbefore noted, the display device may be of any known technology for presenting display screens to a user. A storage device 218, such as a hard drive unit, is also coupled to the bus 203. The diskette drive unit 219 and CD drive 222 provide a means by which individual diskette or CD programs may be loaded on to the hard drive, or accessed directly, for selective execution by the computer system 101. As is well known, program diskettes containing application programs represented by indicia on the diskette or CD programs in system memory, or downloaded or acquired through a local private network or through the Internet may be read to provide program signals. Such program signals are selectively effective to cause the computer system to present displays on the screen of a display device and respond to user inputs in accordance with the functional flow of the application program being executed.

Figure 3:
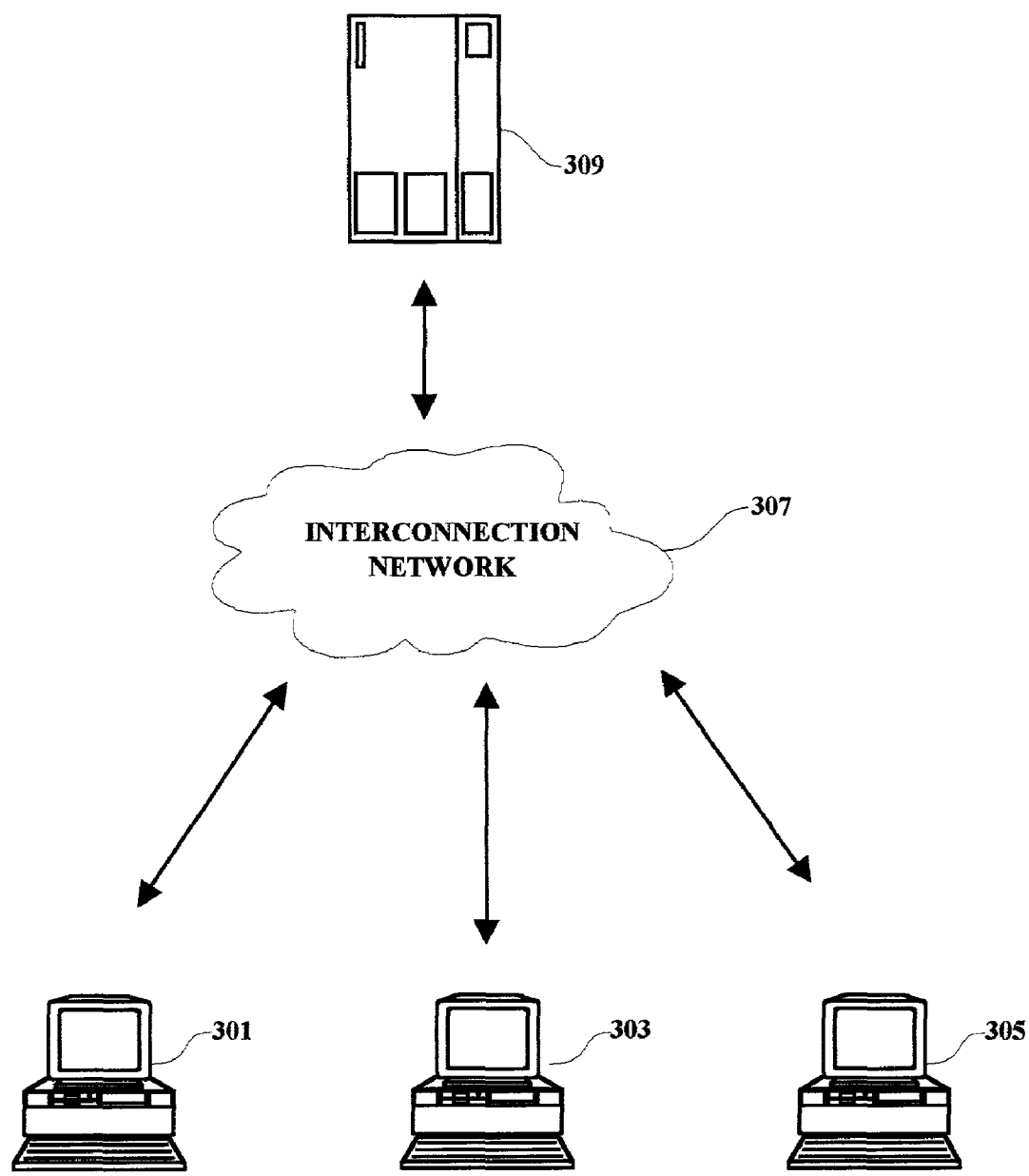
FIG. 3 is an illustration of an exemplary network arrangement which is used in explaining the present invention.

In the exemplary embodiment illustrated in FIG. 3, there are three agent terminals 301, 303 and 305 which are arranged for selective connection through a network connection 307 to a company server 309. In the normal course of business, sensitive information such as an agent's identification number and a social security number of an insured individual, are inserted into records and transmitted over a network 307 among agents' terminals 301-305 and also between agents' terminals and a company server 309. In the example, when an individuals social security number is keyed-in by an agent or otherwise referenced in accessing records or transmitting information, the social security number is recognized as sensitive information and the social security number is masked such that it is not recognizable as such at the agent's terminal or during any subsequent transmission of the social security number. The number is deciphered in order to access the associated record but is not displayed or carried in its original form during a processing transaction. Thus, the social security number of the individual, which is typically entered in a predetermined field of a report form for example, is automatically masked and is never exposed to casual observers while it is used for reference in conducting business transactions.

Figure 4:
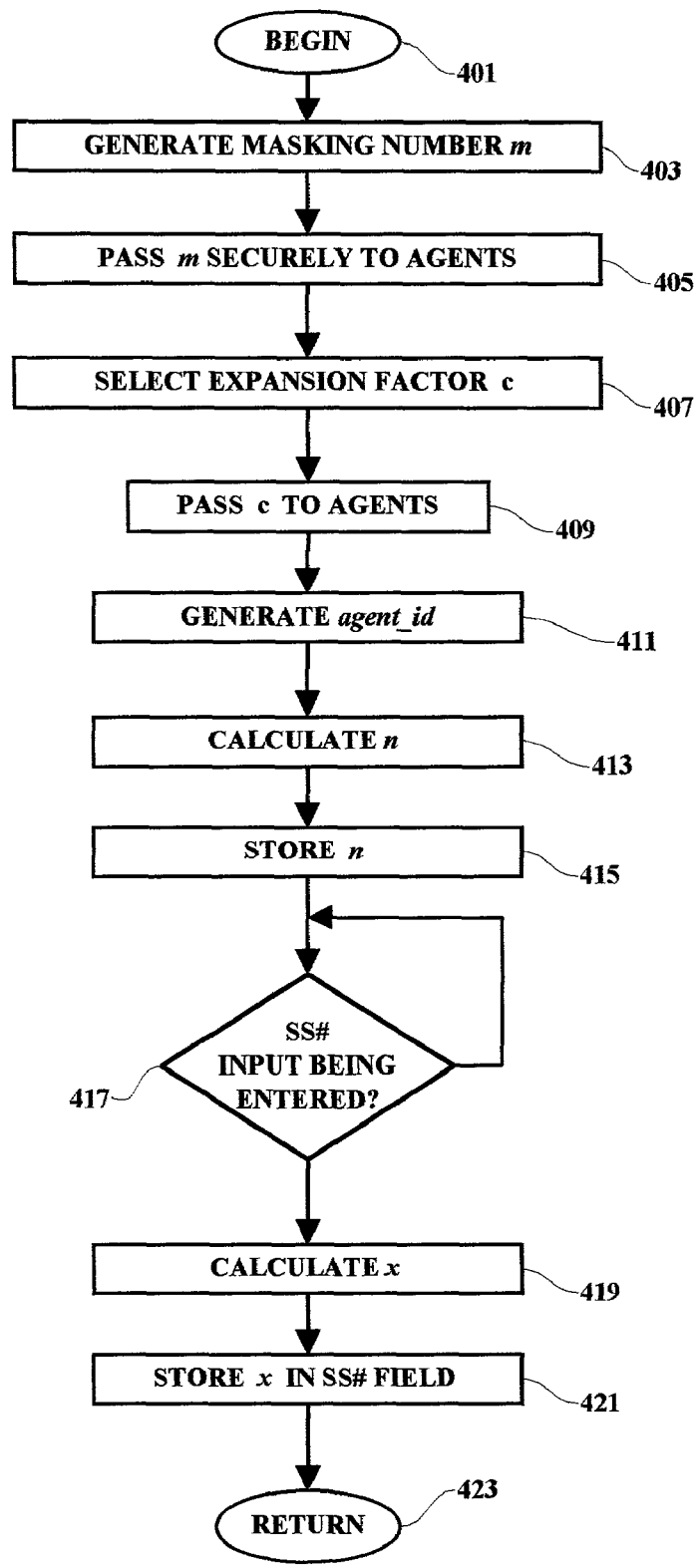
FIG. 4 is a flowchart illustrating an operational sequence in an exemplary embodiment of the disclosed masking methodology.

In FIG. 4, an exemplary flowchart is illustrated of an social security number masking sequence in accordance with the present invention. The content and sequence of the operations illustrated in FIG. 4 may be modified without departing from the scope of the present invention. In the example, a social security number of a customer is masked during a related transaction such as the reporting of an insurance claim. The disclosed methodology includes certain preliminary steps in order to prepare the processing system for processing a social security number, for example, during the filing of an insurance or other claim. In the exemplary sequence shown in FIG. 4, the methodology begins 401 at the company server 309. At the server, a random 72-bit masking number m is generated 403. The random masking number m is generated centrally at the company server and m will be the same for all agents. The random masking number m is passed in a secure manner 405 to all agents' workstations, e.g. 301-305, but the random masking number m will not be stored at any of the workstations. Next, a 72-bit expansion factor or number c is chosen 407 such that the least significant bit of c is equal to "1". The value of c is also passed 409 to the agent terminals 301-307, but unlike m it is not necessary to keep the value c secret.

At the agent's workstation, e.g. 301, an agent_id is generated 411. For purposes of the following disclosure, the symbol "X" is used as a shorthand symbol for a logical exclusive "OR" function or "XOR". The agent's ID number is represented by a 72-bit string. If the actual agent's ID is longer than 72 bits, then it should be truncated to obtain agent_id. If the agent's ID is shorter than 72-bits, then it is multiplied by a certain non-secret number b and then a remainder taken (mod N) where N=2 (superscript 72). The resulting 72-bit number is agent_id. Next, a masking factor n is determined. The factor n=m X agent_id is calculated 413 and stored 415 and all knowledge of the value of m are eliminated from the agent's workstation. At this point, the preliminary steps have been completed and the system is ready to process, for example, input social security numbers. When it is detected that an input is being entered into a form field which is used for social security numbers 417, the value x, i.e. the masked social security number, is calculated 419 and stored 421 in the social security number field on the displayed form at the user or agent terminal. The value x is calculated as follows: x={[s*c (mod N)] X n} X agent_id. At this point, the masking process is complete and the number masking processing is returned 423 to the claim form processing application at the agent's terminal.

Figure 5:
FIG. 5 is an exemplary illustration of a processing sequence using a specific social security number.
Figure 5:

With reference to FIG. 5, an exemplary set of calculations is illustrated. In the example, certain numbers (S, m, c, agent_id) are assumed for the purpose of illustration, and the remaining numbers (n, x, u) are calculated in accordance with the methodology herein disclosed. As illustrated, an exemplary social security number "123498765" is assumed. A social security number contains nine digits. Each digit is represented by a 4-bit binary string, so that a whole social security number can be viewed as a string of 36 binary digits, i.e. a string of 36 "ones" and "zeroes". Masking a 36 bit number as another 36 bit long string is not a good solution since even an unsophisticated attacker with minimal computing resources can generate a search based on all possible masking parameters, determine the parameter in use and obtain access to all social security numbers. Thus, the use of longer strings is implemented to serve as masking numbers. In the exemplary embodiment, a 72-bit output is used although it is understood that other output lengths are applicable. The strength of a 72-bit output is considered more than sufficient for purposes of privacy protection.

Further, in accordance with the present invention, the masking bit string is not stored in the clear at an agent's terminal. The 72-bit output corresponding to the masked social security number is further masked by using the agent's identification (ID) number. As is hereinafter explained, the masking bit string is never calculated at the agent's workstation or terminal even in the process of masking a social security number.

When a customer's social security number s is entered, for example by typing it at an agent's terminal, the social security number is processed and stored as:
x={[s*c(mod N)] X n} X agent_id as hereinbefore noted. The value of m never explicitly appears during this calculation and is never computed as an intermediate result. The value x can then be sent to the company's main processing center 309 according to business needs and practices. If intercepted or viewed accidentally, the value x tells nothing about the person's social security number s. When x is received by the company's computer 309 in the 72-bit field allocated to the social security number in the existing company applications, it is converted into s by the formula:
s=(x X m)*(c superscript: −1) (mod N). If, a person's social security number needs to be passed in a record sent from the company computer 309 to an agent 301-305, the process is repeated in reverse order.

In addition to making m unavailable to an intruder, an alternative scheme will hide the value of c used in the preferred embodiment. Thus, the value of c is distributed to each agent's workstation over a secure channel and is immediately XORed (X) with the value of agent_id to compute U=c X agent_id. Then while performing the calculation, an application on the agent's computer terminal will have to compute x={[s*(u X agent_id) (mod N)] X n} X agent_id. On the receiving side of a transmission, the value of c is stored securely so no changes to the algorithm are necessary. In the FIG. 5 example, the first 48 bits of s*c(mod N) are all "1", followed by the last 24 bits as illustrated. The first 48 bits of the value x repeat a "1010" pattern, and the final 24 bits are as shown.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code stored on a disk or diskette (portable or fixed), or other memory device, from which it may be executed to achieve the beneficial results as described herein.

Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing sensitive information which is entered at a first computer terminal in a processing transaction for transmission to a second computer terminal, said method comprising:

receiving input information at said first computer terminal;

determining that only, a portion of said input information is sensitive information;

masking said sensitive information to provide a masked sensitive information entry by combining said sensitive information with a masking factor, said masking factor including a masking number, said masking number being generated at said second computer terminal, said masking number being securely transmitted to said first computer terminal for use in calculating said masking factor, said masking number being deleted from said first computer terminal after determining said masking factor; and causing said masked sensitive information entry to be used in place of said sensitive information such that said sensitive information is not recognizable as such when said input information is displayed at said first computer terminal.

2. The method as set forth in claim 1 wherein said masking factor comprises said masking number combined with a bit string, said bit string being saved as a separate entity at said first computer terminal.

3. The method as set forth in claim 2 wherein said bit string is representative of an identification of an individual associated with said processing transaction.

4. The method as set forth in claim 1 wherein said sensitive information is comprised of a social security number.

5. The method as set forth in claim 1 wherein said sensitive information is comprised of charge card information, said charge card information being usable for charging a customer account.

6. The method as set forth in claim 1 wherein said combining comprises performing an exclusive OR function using said masking factor.

7. The method as set forth in claim 1 wherein said masking factor comprises a masking number combined with an agent identification number, said agent identification number being related to a particular agent associated with said processing transaction.

8. The method as set forth in claim 1 and further including initiating said processing upon detection of an input of said sensitive information to said first computer terminal.

9. The method as set forth in claim 8 wherein said processing transaction includes providing input to an input form displayed at said first computer terminal, said initiating being commenced upon detection of an input to a predetermined field of said input form.

10. A computer program product comprising a computer-readable, tangible storage device(s) and computer-readable program instructions stored on the computer-readable, tangible storage device(s) for enabling a processing of sensitive information which is entered at a first computer terminal in a processing transaction for transmission to a second computer terminal, the computer-readable program instructions, when executed by a processing system, being operable for implementing a method comprising:

receiving input information at said first computer terminal;

determining that only a portion of said input information is sensitive information;

masking said sensitive information to provide a masked sensitive information entry by combining said sensitive information with a masking factor, said masking factor including a masking number, said masking number being generated at said second computer terminal, said masking number being securely transmitted to said first computer terminal for use in calculating said masking factor, said masking number being deleted from said first, computer terminal after determining said masking factor; and causing said masked sensitive information entry to be used in place of said sensitive information such that said sensitive information is not recognizable as such when said input information is displayed at said first computer terminal.

11. The computer program product as set forth in claim 10 wherein said masking factor comprises said masking number combined with a bit string, said bit string being saved as a separate entity at said first computer terminal.

12. The computer program product as set forth in claim 11 wherein said bit string is representative of an identification of an individual associated with said processing transaction.

13. The computer program product as set forth in claim 10 wherein said sensitive information is comprised of a social security number.

14. The computer program product as set forth in claim 10 wherein said sensitive information is comprised of charge card information, said charge card information being usable for charging a customer account.

15. The computer program product as set forth in claim 10 wherein said combining comprises performing an exclusive OR function using said bit string and said masking factor.

16. The computer program product as set forth in claim 10 wherein said masking factor comprises a masking number combined with an agent identification number, said agent identification number being related to a particular agent associated with said processing transaction.

17. The computer program product as set forth in claim 10 wherein said method further includes initiating said processing upon detection of an input of said sensitive information to said first computer terminal.

18. The computer program product as set forth in claim 17 wherein said processing transaction includes providing input to an input form displayed at said first computer terminal, said initiating being commenced upon detection of an input to a predetermined field of said input form.

19. A computer system comprising:

a first computer terminal;

a server computer; and a network arranged to selectively connect said first computer terminal with said server computer to enable a processing of sensitive information which is entered at said first computer terminal in a processing transaction for transmission to said server computer, said first computer terminal being operable for receiving input information and determining that only a portion of said input information is sensitive information, said computer system further including a transforming device to transform only said sensitive information into a first bit string and expanding said first bit string into a second bit string of a predetermined length, said computer system further including a masking device to mask said second bit string to create a masked sensitive information entry by combining said second bit string with a masking factor, said masking factor including a masking number, said masking number being generated at a second computer terminal, said masking number being securely transmitted to said first computer terminal for use in calculating said masking factor, said masking, number being deleted from said first computer terminal after determining said masking factor, said computer system being further operable to cause said masked sensitive information entry to be used in place of said sensitive information such that said sensitive information is not recognizable as such when said input information is displayed at said first computer terminal.

* * * * *